United States Patent
Banker et al.

(10) Patent No.: US 6,776,908 B1
(45) Date of Patent: Aug. 17, 2004

(54) MICRO-EQUILIBRIUM DIALYSIS VERTICALLY-LOADED APPARATUS

(75) Inventors: Michael J. Banker, Pawcatuck, CT (US); Timothy J. Zuzel, Norwich, CT (US); John A. Williams, Gales Ferry, CT (US)

(73) Assignee: Pfizer Inc., New York, NY (US)

( * ) Notice: Subject to any disclaimer, the term of this patent is extended or adjusted under 35 U.S.C. 154(b) by 62 days.

(21) Appl. No.: 09/672,323

(22) Filed: Sep. 28, 2000

Related U.S. Application Data

(60) Provisional application No. 60/156,800, filed on Sep. 30, 1999.

(51) Int. Cl.[7] .............................................. B01D 61/28
(52) U.S. Cl. .............................. 210/321.6; 210/321.84; 422/99; 422/101
(58) Field of Search ......................... 210/321.6, 321.72, 210/321.75, 321.84; 422/99, 101, 102

(56) References Cited

U.S. PATENT DOCUMENTS 3,623,611 A  *  11/1971  Riley et al.

OTHER PUBLICATIONS

Dianorm GMBH brochure (Dec. 1983).*
Journal of Pharmaceutical Sciences, vol. 90, No. 5, pp. 580–587 (May, 2001).*
Multi–Equilibrium Dialysis brochure by the Nest Group (2001).*
Harvard/Amika Interaction Studies (Multi–Equilibrium Dialyzer) brochure (undated).*
Advertisement, Pierce Chemical Company, PO Box 117, Rockford, Illinois, 61105, U.S.A., Slide–A–Lyzer MINI Dialysis Units, 1999.
Advertisement, Amika Corp., 8980 F. Route 108, Columbia, MD 21045, USA, 96–Well Equilibrium Dialyzer (undated).

* cited by examiner

*Primary Examiner*—John Kim
(74) *Attorney, Agent, or Firm*—Peter C. Richardson; Gregg C. Benson; Gregory P. Raymer

(57) ABSTRACT

An improved device for equilibrium dialysis procedures utilizing a dialysis membrane inserted in a gap in and separating all of any number of test wells contained in the dialysis block into at least a donating and receiving side which can be accessed and manipulated at any time during testing from the top of the device is described. The device may be constructed from a series of nine blocks of virgin teflon, cut and made flat to achieve certain dimensions ideal for making the device compatible with standard 96-well format laboratory equipment and conducive to robotic automation. The bars are placed side-by-side and connected by a pair of alignment pins along which the bars can slide on a horizontal plane relative to one another, individually or collectively, to aid in assembly, usage and cleaning. The bars are further held together during usage by a clamping mechanism to prevent any leakage of the sample being tested. Such wells are formed in an 8×12 array such that a diameter of each of the wells of a particular row corresponds to and overlaps with the separation gap between successive rows of the bars. The dialysis membranes are inserted into the gaps during assembly of the device, with one membrane inserted between each of the eight gaps formed between the nine rows of bars. The advantages of an equilibrium dialysis apparatus constructed in this manner include decreased cost, increased efficiency and ease in testing, and increased flexibility in testing methods.

7 Claims, 2 Drawing Sheets

MICRO-EQUILIBRIUM DIALYSIS VERTICALLY-LOADED APPARATUS

CROSS-REFERENCE TO RELATED APPLICATIONS

This application claims priority to U.S. Provisional Application 60/156,800 filed Sep. 30, 1999.

FIELD OF THE INVENTION

The present invention relates to the field of equilibrium dialysis devices. More particularly, the present invention describes a micro-equilibrium dialysis apparatus utilizing any number of dialysis membranes vertically inserted through a dialysis block containing any number of sample wells, such that both the donating and receiving sides of all wells can be accessed from the top of the apparatus at any time.

BACKGROUND OF THE INVENTION

Equilibrium dialysis is a procedure for measuring the concentration of free, relatively small molecules in a sample. The procedure was originally designed to study the quantitative aspects of immunity reactions and, over the years, the procedure has been employed primarily in immunological studies. See, e.g., J. Marrack and F. C. Smith, Brit. J. Exptl. Path., 13, 394 (1932), F. Haurowitz and F. Breirl, Z. Physiol. Chem., 214, 111 (1933), H. N. Eisen and F. Karush, J. Am. Chem. Soc., 71, 363 (1949), and D. N. Weir, Editor, "Handbook of Experimental Immunology", Second Edition, Blackwell Scientific Publications, Oxford, 1973, pp. 16.1–16.21 . Furthermore, equilibrium dialysis has been considered an ideal approach to study binding of small molecules or ions (ligants) to macromolecules (proteins) and such studies have been very important in many fields, including biochemistry and pharmacology.

In principle, equilibrium dialysis can be employed to provide a sample from which one can determine the concentration of relatively small molecules; the only requirement is that the material to be measured must pass freely through a semi-permeable membrane. Once equilibrium has been achieved, since the concentration of the freely movable material is the same on both sides of the membrane, it is only necessary to analyze the dialysate for the desired material.

Historically, equilibrium dialysis applications, such as binding and affinity studies, have been slow, difficult and costly to perform. One of the best currently available devices for equilibrium dialysis, for example, only allows for a maximum of twenty samples to be tested simultaneously per device and requires expensive equipment which is often difficult to use and timely to assemble. The device also is not adaptable to standard 96-well pipetting equipment nor does it easily lend itself to automation through the use of robotic systems. Additionally, the orientation of the equipment results in difficulty accessing or removing independent samples during dialysis.

This currently available device utilizes oval or circular dialysis membranes which are placed on top of a hemispherical or cylindrical lower half of the testing cell and over which is joined the corresponding top half of the cell. The samples are inserted into the cells using a syringe with a blunt nose needle. Up to five cells can be stacked together and once assembled and filled, the stack is rotated continuously on the axis perpendicular to the dialysis membranes on a spit-like mechanism. Four rows of cells can be placed on top of one another in the dialyzer such that a maximum of twenty cells can be utilized at one time. The temperature of the dialyzer can be varied between −10 and 65° C. using a water bath or a coldroom, and the cells can be rotated at adjustable speeds between 5 and 30 RPM.

One problem with this spatial orientation is that it requires continuous rotation of the test cells so that the samples remain in constant contact with the dialysis membrane so as to avoid concentration polarization. Additionally, this orientation, in a system which is scaled down, such as in the case of the present invention, would result in other problems such as air bubbles which become trapped against the dialysis membrane and slow or prohibit dialysis and the inability to maintain the surface area to volume ratio of the sample as the volume of sample to be tested changes.

OBJECTS AND SUMMARY OF THE INVENTION

It is, therefore, an object of the present invention to provide for an improved device for conducting equilibrium dialysis assays.

Another object of the present invention is to greatly reduce the cost of conducting equilibrium dialysis assays.

Another object of the present invention is to improve upon current methods of conducting equilibrium dialysis assays by providing for vertical placement of dialysis membranes though the well so that both sides of the well are accessible at all times.

Another object of the present invention is to utilize a material for the construction of the dialysis block such that non-specific binding of the samples tested to the surface of the block is minimized.

Broadly, the present invention discloses a dialysis block comprising a top and bottom surface, containing one or more wells separated by a dialysis membrane into sections accessible from the top of the device, in which wells a testing substance may be placed. In one specific embodiment, a plurality of prefabricated well-membrane bodies are placed into wells formed into the dialysis block. The well-membrane bodies are preferably formed as a singular body, by any of a variety of methods such as by injection molding. In another specific embodiment, each well is divisible by a gap passing along a vertical plane perpendicular to the top and bottom planes of the block and passing through the entire depth of the well. A dialysis membrane is placed in the gap, dividing the well into two, for the sample and dialysis buffer respectively. The gap preferably is of a depth larger than the depth of any well formed and preferably of a diameter larger than that of such well so as to minimize leaking of the test substance between the two sides of the well.

The block may be made of any of a variety of shapes, sizes or materials. The material of the block is preferably a material that will minimize non-specific binding of the samples to be tested. Suitable materials include some type of PTFE (polytetrafluoroethylene or Teflon®). Any number of wells may be used. Also, wells of any depth and diameter may be formed. In one suitable implementation, the number of wells is ninety-six, arranged in an 8×12 array, of such predetermined spacing and dimensions as to make the wells accessible to and compatible with all standard 96-well format laboratory supplies and instruments. Preferably, the wells are formed by drilling holes into the dialysis block.

Preferably, the gaps in the wells through which the dialysis membrane may be placed are formed by using two or more bars to form the body of the block. The wells are typically formed so that they overlap with, and are split by, the gaps formed between adjacent bars. When the wells are formed in this manner, the planar gaps between adjacent bars which are perpendicular to the top and bottom surfaces of the block, provide gaps of necessary thickness and depth for the placement of the dialysis membrane.

Preferably, the bars are formed by cutting larger blocks to predetermined dimensions and then milling the individual bars to make them flat. In one preferred embodiment, nine such bars are used to provide sufficient spacing for an array of ninety-six wells arranged in eight rows and twelve columns. In such an embodiment, the eight membranes are placed between each of the nine rows of bars and divide each of the ninety-six wells into even halves along a diameter of the well. The nine rows of bars are then held together by any method, preferably clamping, in order to prevent leakage of the sample tested.

Optionally, two or more alignment pins, of a length sufficient for all bars to rest on the pins, are inserted through holes formed in each of the two sides of the bars added. The bars are constructed to slide on the pins in a horizontal plane relative to one another to simplify set-up and usage.

One advantage of the present invention is to provide for the ability to conduct much larger numbers of assays in a given time frame, allowing an investigator to conduct a wider range of experiments than previously considered possible. For example, using a preferred embodiment of the present invention containing sample wells arranged in a 96-well array so as to be compatible with standard 96-well format laboratory supplies and instruments, and combining eight such arrays in parallel, an investigator could easily and cheaply conduct over one thousand assays in the same time previously needed to conduct twenty with a device embodying the prior art. Additionally, using a device embodying the prior art, up to four hours of investigator time were required for set-up, clean-up and collection of results from one twenty-sample test group. Using the preferred embodiment of the present invention described above, and combining eleven such devices in parallel, the time required for an investigator to perform the same tasks to conduct over 1000 dialysis assays is less than three hours.

Another advantage of the preferred embodiment is its compatibility with standard 96-well pipetting equipment and the ability to easily automate the processing of donating and receiving samples of the dialysis assay using readily available robotic systems. Such an embodiment allows the investigator to analyze a much larger number of samples, time points, or replicates in the same experiment than previously possible using the prior art. Furthermore, by varying the dimensions of the wells and their location relative to one another, arrays of various sizes and dimensions can be formed so as to make the wells compatible with other and future laboratory supplies and equipment.

Additionally, any embodiment incorporating the present invention can be agitated by shaking or rotating the device in controlled temperature environments, thereby decreasing the time required to achieve equilibrium or alternatively stabilizing the compounds being studied.

Other advantages of the present invention, resulting from the placement of the dialysis membranes vertically through the wells rather than on top of the wells, include: (1) the ability to dispense to and/or sample from either or both the sample and dialysate sides from the top of the apparatus at any time during the experiment without taking the apparatus apart and stopping the assay; (2) the elimination of problems associated with trapped air pockets such as an increase in the time required for reactions to reach equilibrium; and (3) the ability to add or remove specific samples independently from the others. Furthermore, this orientation of the dialysis membrane maximizes the surface area to volume ratio and maintains the surface area to volume ratio as the volume of the reaction is increased, thereby decreasing the time required for reactions to reach equilibrium.

One additional advantage of the preferred embodiment of the present invention is a significant reduction in the cost of the equipment required for conducting equilibrium dialysis assays. The preferred embodiment of the present invention is easy and inexpensive to construct, quick and easy to assemble, use, disassemble and clean, and, with the exception of the dialysis membranes, reusable.

BRIEF DESCRIPTION OF THE DRAWINGS

Other features, characteristics and advantages of the present invention will appear to the person of ordinary skill in the art in view of the detailed description below, made with reference to the annexed drawings, in which like reference numerals refer to like elements, and in which.

DETAILED DESCRIPTION OF THE DRAWINGS

According to the present invention, a device is described for equilibrium dialysis procedures which utilizes at least one dialysis membrane interposed in a block comprising the device, through a gap in and separating all of any number of test wells contained in the dialysis block into at least a donating and receiving side which can be accessed and manipulated at any time during testing from the top of the device.

Figure 1:
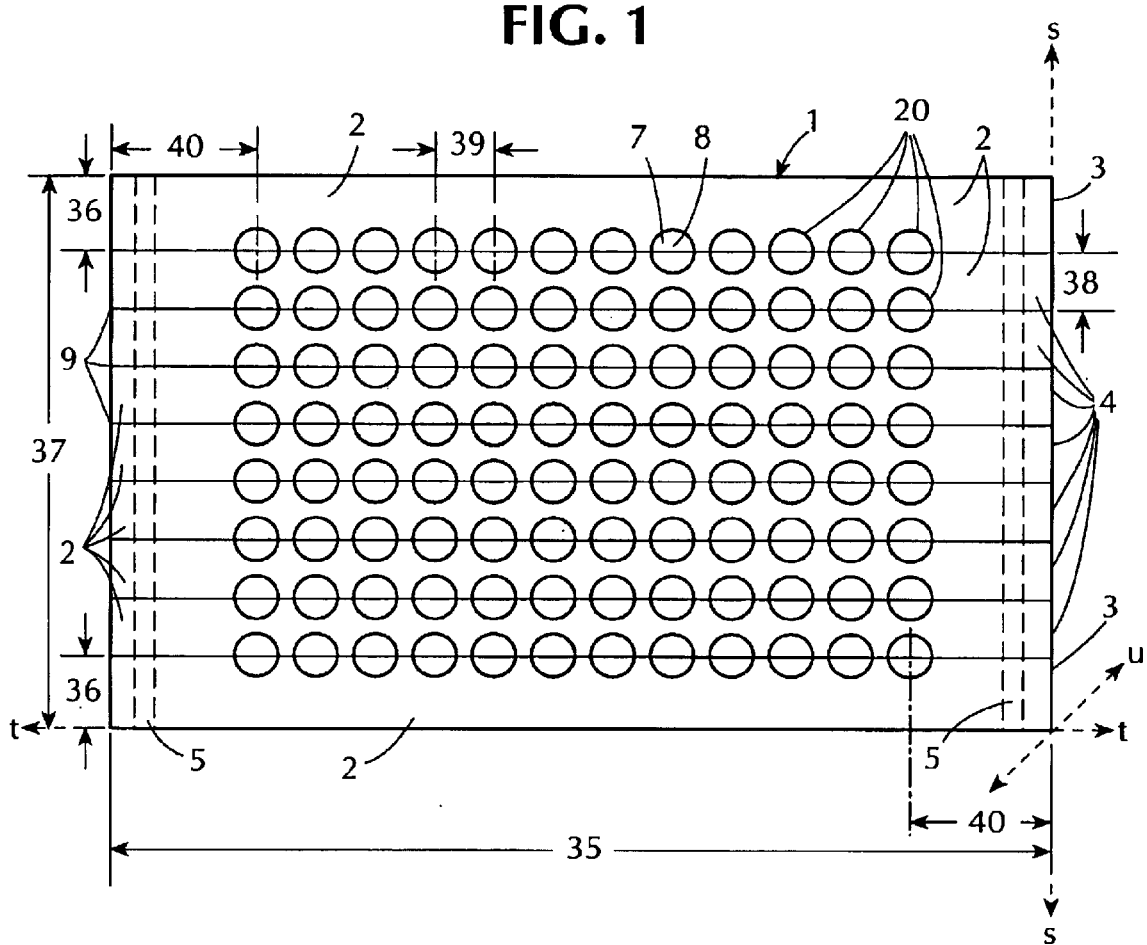
FIG. 1 is a top view of one preferred embodiment of a dialysis block incorporating features of the present invention.
Figure 2:
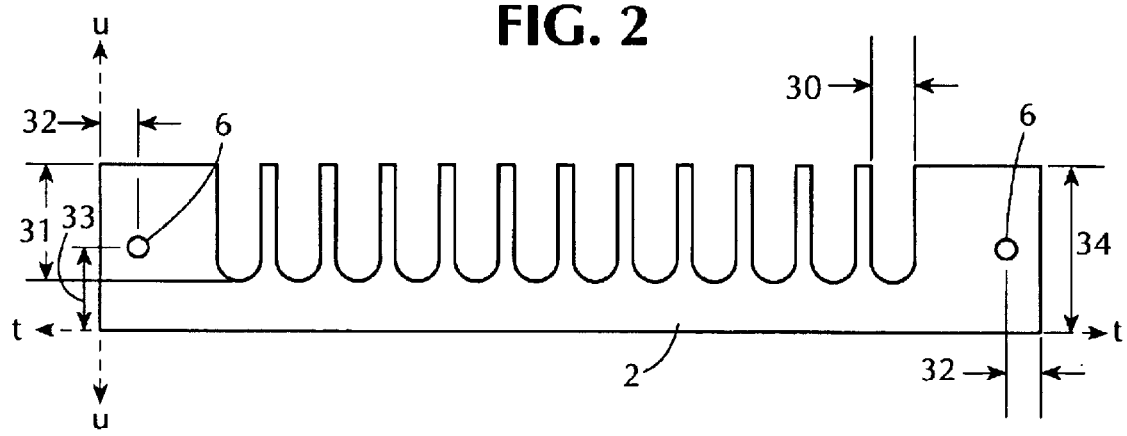
FIG. 2 is a side view of the embodiment shown in FIG. 1.
Figure 3:
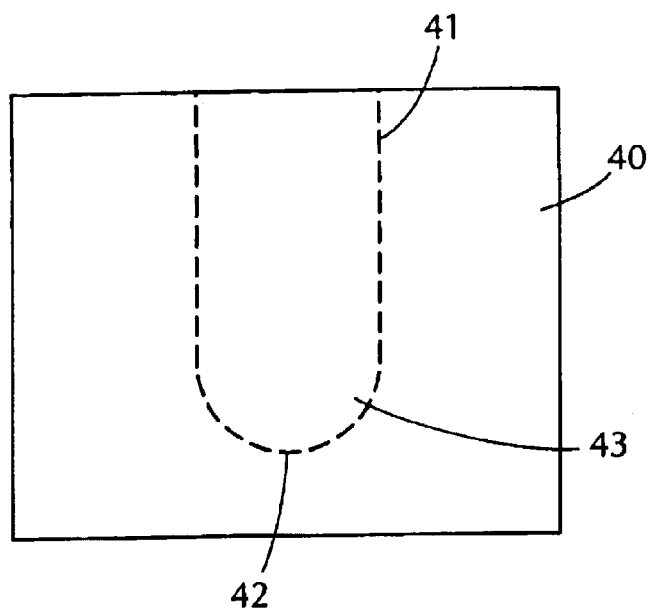
FIG. 3 is a cross-sectional view of the contact surface area formed between a dialysis membrane and a substance placed in either side of a well, in a device incorporating features of the present invention.
Figure 4:
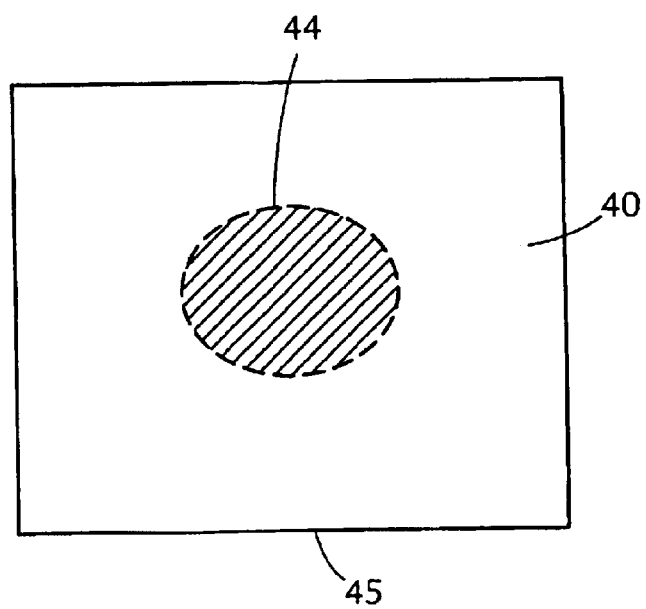
FIG. 4 is a cross-sectional view of the contact surface area formed between a dialysis membrane inserted horizontally on top of a well, and a substance placed in either side of the well, in a device incorporating features of the prior art.

Referring to FIGS. 1–2, a preferred embodiment of the dialysis apparatus is illustrated. FIG. 3 illustrates a cross sectional view of the contact surface area formed between the dialysis membrane and a substance placed in either side of a single well when the dialysis membrane is interposed using a device employing the present invention. FIG. 4 illustrates a cross sectional view of the contact surface area formed between a dialysis membrane placed over a single well and a substance placed in either side of a single well using a device employing the prior art.

A simplified embodiment utilizing the methods described in the present invention can be formed using a singular body of material 1 (body formed by nine separate bars 2 shown) in which one or more wells 20 (96 wells are shown in an 8×12 array) are formed in the body by any means, but preferably by drilling. Each well 20 so formed requires a gap 9 (eight gaps are shown), of a width at least as large as the diameter of a given well 30 (as shown, although the gap in FIGS. 1–2 comprises the entire length 35 of the bars), and of a depth at least as great as the depth 31 of a given well (as shown, although the gap in FIGS. 1–2 comprises the entire height 34 of the bars used), through which a dialysis membrane 40 is inserted, preferably from the top of the body 1. Such gap 9 (eight shown) is formed into the body 1 by any of a variety of means.

One method of simplifying the formation of such a gap, is to utilize two or more separate bars 2 (nine shown) to form the body 1, and to form any well 20 so as to overlap the gap 9 (eight shown) separating adjacent rows of bars 2 such that the well is divided into sections 7,8 by the plane 9,u separating the bars and perpendicular to the planes t,s comprising the top and bottom of the body 1.

In the preferred embodiment illustrated in FIGS. 1–2, the body of the dialysis block 1 is constructed by connecting nine teflon bars 2 of equivalent height 34 and length 35 to form a unified body. Each teflon bar 2 is formed by cutting a larger PTFE block according to predetermined dimensions. The height of the bars 34 is selected so as to allow for wells 20 of sufficient depth 31 for the volume of sample to be tested. The length 35 and total width 37 of the bars is selected so as to allow for sufficient spacing of ninety-six wells arranged in an 8×12 array which will be compatible with standard 96-well format laboratory supplies and equipment. The body 1 consists of two end bars 3 of equivalent width 36 and seven middle bars 4, also of equivalent width 38. Once each teflon bar 2 is cut to predetermined dimensions, the bars 2 are made flat, preferably by milling. Processing the bars 2 to make them as flat as possible is preferable not only to aid in assembly, but also to prevent leakage of the testing substances once they are placed in the wells 20.

Once each teflon bar 2 is formed and made flat, the nine bars 2 are placed side-by-side to form a unified body 1 of set length 35, width 37, and height 34, and held together for further processing by any of a variety of means. One preferable way is to hold the bars 2 together by means of alignment pins 5 (two shown). Two holes 6 of predetermined diameter are made, one in each end of each bar 2, preferably by drilling at a predetermined distance from the end 32 and top 33 of each bar 2. Both holes 6 need not be at the same distance from the end 32 or top 33 of each bar 2 but such an equivalence simplifies the construction process. The diameter (not shown) of the holes 6 roughly corresponds to, but are not less than, the diameter or width of the pins inserted 5.

Two alignment pins 5 are inserted, one through each hole 6, and are of such length 37 as to approximate the total width of the body once the nine bars 2 are joined so that all nine bars may rest on the pins 5. While the preferred embodiment has been described with two alignment pins 5, it should be noted that one or more pins or rails would prove satisfactory in this regard, so long as the pins do not compromise any of the testing wells 20 and are of a length (37 as shown) sufficient to allow all the bars 2 to rest on the pins 5. The purpose of the alignment pins 5 is not only to aid in subsequent processing of the dialysis block 1, but also to allow for the movement of the various bars 2 relative to one another on the pins 5, in a horizontal plane s when setting up, utilizing, or cleaning the device.

Once the bars 2 are placed together and the alignment pins 5 are inserted through the holes 6, testing wells 20 (96 shown) are formed in the body of the device 1. Each well 20 is divided into sections 7,8, preferably equal, by the plane 9,u (eight shown) separating the bars 2 and perpendicular to the planes t,s comprising the top and bottom of the body 1. The wells 20 are preferably formed by drilling into the bars 2 with a ball end mill of predetermined diameter 30 to a predetermined depth 31. The depth 31 and diameter 30 of the wells 20 roughly correspond with twice the volume of sample to be tested and the dimensions required so as to make the wells 20 compatible with standard 96-well format laboratory supplies and equipment. The wells 20 are preferably arranged in an 8×12 array such that the eight rows 2 of wells 20 corresponds to the eight separation planes 9,u formed between the nine rows of teflon bars 2.

In this preferred embodiment, eight dialysis membranes 40 (one shown) are utilized, one placed in each of the eight separation planes 9,u formed between the nine rows of bars 2. A clamping mechanism (not shown) surrounding all or any part of the body 1 is preferably used to further align the bars 2 and to prevent leakage of the sample once added to the wells 20. For example, in an implementation of the preferred embodiment shown in FIGS. 1–2 designed to be compatible with standard 96-well format laboratory supplies and equipment, the wells are drilled using a ¼" (0.635 cm) bar end mill to a depth (31) of 0.7" (1.778 cm); the height (34) of the bars is 0.1" (2.54 cm); the alignment holes (6) are located 0.2" (0.508 cm) from the end of each bar (32) and 0.5" (1.27 cm) from the top of each bar (33); the holes for the alignment pins are formed using a drill with a ⅛" (0.318 cm) bit; the length (35) of the bars is 5.5" (13.97 cm); the width of the end bars (36) is 0.45" (1.143 cm) and the width of the middle bars (38) is 0.35" (0.89 cm) forming a total width (37) for the body of 3.35" (8.51 cm); the center of each well is located 0.35" (0.89 cm) from the center of the next contiguous well on all four sides (38,39); and the center of the wells on both ends of each row is located 0.825" (2.096 cm) from the end of the bar (40).

During set-up, a first end bar 3 is placed on the two alignment pins 5 which are inserted through the alignment holes 6 in the bar. The first dialysis membrane 40 (one shown) is then placed along the end bar 3 before the first middle bar 4 is placed on the alignment pins 5. The process continues with a dialysis membrane 40 (one shown) inserted between each of the middle bars 4, and between the final middle bar 4 and the end bar 3. Dialysis membranes of suitable size can be made by cutting larger flat sheets or tubes of material to the proper dimensions. Finally, once the last end piece 3 is inserted on the alignment pins 5, the clamping mechanism (not shown) is placed around the sides of the device to prevent leakage and further align the bars 2.

During usage, the samples are placed in the donating side 7 or 8 of each well 20, a dialysis buffer or ultra-filtrated serum without proteins is placed in the receiving side 7 or 8 of each well, and a cover (not shown), preferably any type of easily removable cover, is placed over the top of the device to prevent evaporation during incubation. At any time during testing, both the donating and receiving sides 7,8 of the wells 20 can be accessed or sampled. If a device of suitable dimensions has been constructed, standard 96-well format pipetting equipment and robotics can be used to simplify or automate the process.

Additionally, the temperature of the samples may be varied by using any of a variety of mechanisms (not shown) in conjunction with the device, such as an incubator, a water bath, or a coldroom, and the device, once assembled, may be placed on a platform (not shown) at any of a variety of angles, and may be rotated by any of a variety of means to allow for mixing. Furthermore, once testing is completed, the device can be removed from the platform (not shown) if used, the clamp (not shown), if used, can be removed, the cover (not shown), if used, can be removed, the bars 2 can be removed from the alignment pins 5, the dialysis membranes 40 (one shown) can be disposed of, the device can be cleaned, preferably with a non-ionic detergent followed by a water rinse, and the process can begin again quickly and easily. FIGS. 3–4 illustrate one of the primary differences between an embodiment using the prior art and an embodiment of a device using the present invention. In the prior art, wells of hemi-spherical or cylindrical shape 44 (cross section shown) are formed in the bottom section of the device 5 (not shown). A test substance (not shown) is placed in the bottom half of the well 44 (cross section shown) and the dialysis membrane 40 is placed over the well 44 (cross section shown) which is then covered with the top half of the well (cross-section shown) of corresponding shape. The cross sectional surface area 45 formed by the contact between the test substance (not shown) and the well 44 (cross section shown) is either oval or circular in shape. In comparison, in an embodiment of a device using the present invention, the cross sectional surface area formed between the well 41 (cross section shown) and the membrane 40 is rectangular in shape 41 with either a flat, arc or pointed bottom end 42.

We claim:

1. An equilibrium dialysis apparatus comprising a body, comprising a top surface having a first plane and a bottom surface having a second plane, in which body is contained ninety-six wells arranged in an 8×12 array, each of which wells is separated into a first side and a second side, by means for vertically separating the well, such that both of said sides of each well are fully open and accessible from the top surface of the body and closed on said bottom surface, wherein said body of the device comprises the material polytetrafluoroethylene, and wherein said means for vertically separating the well include dialysis membranes.

2. The apparatus of claim 1, wherein said array comprises spacing and dimensions compatible with standard 96-well format laboratory supplies and instruments.

3. An equilibrium dialysis apparatus comprising a body, comprising a top surface having a first plane and a bottom surface having a second plane, in which body is contained 96 wells, each of which wells is separated into a first side and a second side separated by said planar gap, by means for vertically separating the well, such that both of said sides of each well are fully open and accessible from the top surface of the body and closed on said bottom surface, wherein said body of the device comprises the material polytetrafluoroethylene, wherein said means for vertically separating the well include dialysis membranes, wherein said body comprises nine bars containing 96 wells arranged in an 8×12 array of such spacing and dimensions as to be compatible with standard 96-well format laboratory supplies and instruments, with adjacent bars separated by a planar gap perpendicular to said first plane and in which gap said dialysis membrane is inserted, and means for holding said bars together.

4. An equilibrium dialysis apparatus comprising:

a body, comprising a top surface having a first plane and a bottom surface having a second plane, in which body is contained at least one testing well, each of which well is separated into a first side and a second side, by means for vertically separating the well, such that both of said sides of each well are fully open and accessible from the top surface of the body and closed on said bottom surface, wherein said body of the device comprises the material polytetrafluoroethylene, and wherein said means for vertically separating the well include dialysis membranes, further wherein said body comprises at least two bars, with adjacent bars separated by a planar gap perpendicular to said first plane and in which gap said dialysis membrane is inserted, and means for holding said bars together comprising at least one pin extending through the bars and on which all such bars can move relative to one another on a horizontal plane.

5. The apparatus of claim 4, wherein said means for holding said bars together further comprise two alignment pins, of a length sufficient for all bars to rest on such pins, each of which is inserted through a hole formed through both sides of each bar added.

6. An equilibrium dialysis apparatus comprising:

a body, comprising a top surface having a first plane and a bottom surface having a second plane, in which body is contained at least one testing well, each of which well is separated into a first side and a second side, by means for vertically separating the well, such that both of said sides of each well are fully open and accessible from the top surface of the body and closed on said bottom surface, wherein said body of the device comprises the material polytetrafluoroethylene, and wherein said means for vertically separating the well include dialysis membranes, further wherein said body comprises at least two bars, with adjacent bars separated by a planar gap perpendicular to said first plane and in which gap said dialysis membrane is inserted, and means for holding said bars together comprising at least one rail on which all such bars can move relative to one another on a horizontal plane.

7. An equilibrium dialysis apparatus comprising:

a body, comprising a top surface having a first plane and a bottom surface having a second plane, in which body is contained at least one testing well, each of which well is separated into a first side and a second side, by means for vertically separating the well, such that both of said sides of each well are fully open and accessible from the top surface of the body and closed on said bottom surface, wherein said body comprises ninety-six wells arranged in an 8×12 array.

* * * * *